United States Patent
Anderson

(10) Patent No.: US 9,067,162 B2
(45) Date of Patent: Jun. 30, 2015

(54) DT VAPOR WASH

(75) Inventor: George E. Anderson, Champlin, MN (US)

(73) Assignee: Crown Iron Works Company, Roseville, MN (US)

(*) Notice: Subject to any disclaimer, the term of this patent is extended or adjusted under 35 U.S.C. 154(b) by 476 days.

(21) Appl. No.: 13/570,854

(22) Filed: Aug. 9, 2012

(65) Prior Publication Data

US 2013/0199052 A1 Aug. 8, 2013

Related U.S. Application Data

(60) Provisional application No. 61/521,995, filed on Aug. 10, 2011.

(51) Int. Cl.
| | | |
|---|---|---|
| *B01D 47/06* | (2006.01) | |
| *A23N 12/08* | (2006.01) | |
| *A23N 12/12* | (2006.01) | |
| *F26B 25/00* | (2006.01) | |

(52) U.S. Cl.
CPC ............... *B01D 47/06* (2013.01); *A23N 12/08* (2013.01); *A23N 12/125* (2013.01); *F26B 25/005* (2013.01)

(58) Field of Classification Search
CPC ....... F26B 25/00; F26B 25/005; A23N 12/08; A23N 12/12; A23N 12/125; B02B 1/08; B01D 47/06
See application file for complete search history.

(56) References Cited

U.S. PATENT DOCUMENTS

| | | |
|---|---|---|
| 2,695,459 A | 11/1954 | Hutchins |
| 4,376,073 A * | 3/1983 | Farmer .......................... 426/656 |
| 5,992,050 A | 11/1999 | Kemper et al. |
| 2010/0115789 A1 | 5/2010 | Lehmann |

FOREIGN PATENT DOCUMENTS

WO    WO 2010/14105 A1    12/2010

OTHER PUBLICATIONS

Kingsbaker, Solvent Extraction Techniques for Soybeans and Other Seeds: Desolventising and Toasting, Jour. of the Am. Oil Chemists' Society, vol. 47, No. 10, Jan. 10, 1970.

* cited by examiner

*Primary Examiner* — Jiping Lu
(74) *Attorney, Agent, or Firm* — Nawrocki, Rooney & Sivertson, P.A.

(57) ABSTRACT

An agricultural product treatment system. A preferred embodiment of the invention includes a truncated conical section which has a small diameter at one end in fluid communication with a conduit array conveying particulate matter from the DT. An open large diameter end of the structure is axially coextensive and coaxial with an expanded diameter conduit portion.

4 Claims, 1 Drawing Sheet

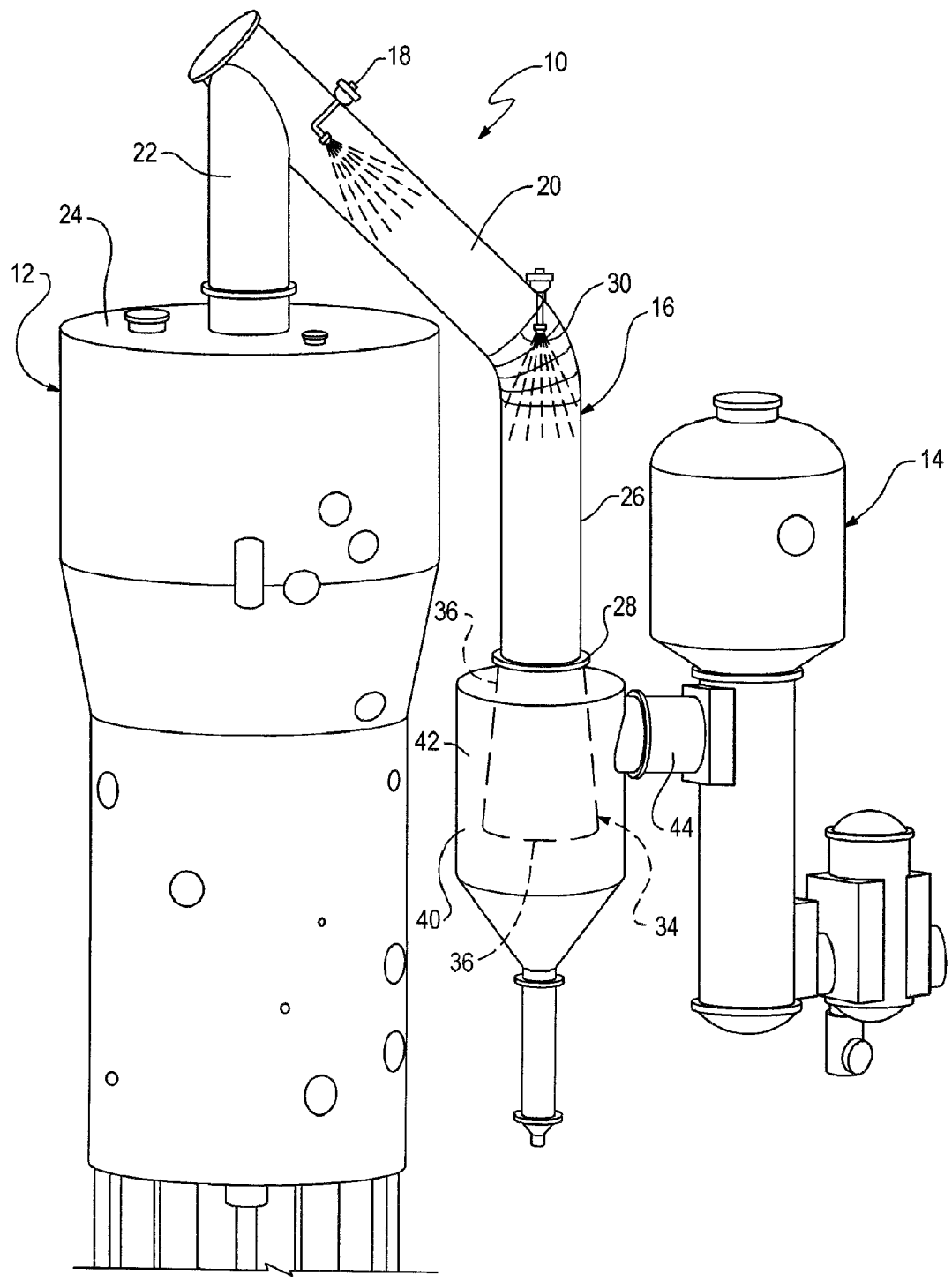

DT VAPOR WASH

CROSS-REFERENCE TO RELATED APPLICATIONS

This is a regular application filed under 35 U.S.C. §111(a) claiming priority, under 35 U.S.C. §119(e)(1), of provisional application Ser. No. 61/521,995, previously filed Aug. 10, 2011, under 35 U.S.C. §111(b).

TECHNICAL FIELD

The present invention is an apparatus for cleaning vapors generated within a desolventizer/toaster (DT) of particulate matter entrained within the vapors and before the vapors are conveyed by conduit to an evaporator. The structure employs unique components interposed between the DT and a down flow evaporator. It is able to achieve a high level of efficiency because of the unique structure.

BACKGROUND OF THE INVENTION

The present invention has, as a goal, the scrubbing or cleaning of vapors from a DT. Particulate matter such as dust is precipitated out of the vapors so that the dust is not ingested into an evaporator used in a processing system. Various attempts have been made to provide solutions to problems dealing with cleaning such vapors. One such attempt has been to employ a cyclone on top of the DT. Such a solution has, however, proven expensive, and it affords undesirable pressure drop. Such a solution is unsatisfactory because it diminishes the efficiency of the overall system.

Another proposed solution has been to provide means for introducing a spray of solvent in the DT. Such a spray is typically located at a point where the vapors go into a duct which allows them to exit the DT. This solution has also proven to be unsatisfactory, however, since the solvent moistens the meal below. In consequence, energy waste occurs. Even further, however, such a solution has proven inefficient in accomplishing cleaning of the vapors.

Another proposed solution is to provide a water wash. As in the case of solvent cleaning, the water wash is positioned in the duct exiting the DT. Again, however, this solution has inherent problems. As in the case of solvent cleaning, unnecessary energy is expended.

It is to these deficiencies that the present invention is directed. The present invention incorporates a concept which allows cleaning of vapors from a DT of particulate matter before the vapors are conveyed to an evaporator.

SUMMARY OF THE INVENTION

The present invention is employed in a system for treating agricultural products. A typical process in which the invention comes into play is treating, for example, grain to remove the hulls thereof. The system with which the present invention is applicable for use has a desolventizer/toaster (DT) and an evaporator connected down flow of the DT by a conduit array. The system further includes a mist injection station in a segment of the conduit array extending downwardly at an acute angle from an egress port rising from an upper end of the DT. A generally vertically extending segment of the conduit array includes communication with an egress end of the segment of the conduit array which extends downwardly at an acute angle. A truncated conical section has a small diameter end in fluid communication with an egress end of the generally vertically extending segment, and an open, large diameter end is axially coextensive and coaxial with an expanded diameter conduit portion. In view of the structure employed, an annular plenum is defined within the expanded diameter conduit portion. A bridge section of the conduit array facilitates passage of fluid flow and particulate matter entrained therein from the annular plenum to the evaporator.

A wall, forming the truncated conical section, relative to an axis with respect to which the various components are defined is, it is intended, small. A preferred embodiment of the invention limits the angle to less than 20 degrees.

The present invention typically includes a mist injection station which can be located in the conduit array so as to employ the station to add chemicals to neutralize various deleterious effects. For example, it can be employed to add chemicals which neutralize the effects of corrosive acids, caustic chemicals, etc.

The product treatment system in accordance with the present invention can employ a truncated conical section which functions with the expandable diameter conduit portion as a cyclone. This allows the achievement of efficiency in the overall system.

The present invention is thus an apparatus for use in a system having a DT and an evaporator apparatus. More specific features of the invention and advantages achieved by those features will become apparent with reference to the detailed description, appended claims, and accompanying drawing FIGURE.

BRIEF DESCRIPTION OF THE DRAWING FIGURE

The FIGURE is a perspective view of a treatment system employing the present invention.

DETAILED DESCRIPTION OF THE INVENTION

Referring now to the drawing wherein like reference numerals denote like elements throughout, the FIGURE illustrates a system 10 for treating agricultural products that have, for example, been processed by using hexane or another solvent. Desolventizers/toasters (DT) are used to recover the solvent and revive the agricultural product.

The FIGURE illustrates a desolventizer/toaster (DT) 12 into which the product being recovered is received. The DT 12 is, in essence, at one end of the process, and an evaporator 14 is at the other end. In between the two is a conduit array 16 through which products are conveyed.

An embodiment of the present invention envisions use of a mist injection station 18. This station 18 is interposed within the conduit array 16 down flow of the DT 12. While other locations for placement of a mist injection station are contemplated, the FIGURE shows it posited in a segment of the conduit array 16 between the DT 12 and evaporator 14 which extends downwardly at an acute angle from an egress port 22 rising from an upper end 24 of the DT 12. It has been found that an angle of 45 degrees relative to the vertical is appropriate for purposes of the system in which the present invention operates.

As shown in the FIGURE, a generally vertically extending segment 26 of the conduit array 16 extends downwardly from an egress end 28 of the angled portion 20. The generally vertically extending segment 26 is in fluid communication with the egress end 30 of the segment of the conduit array 16 extending downwardly at an acute angle.

The egress end 28 of the generally vertical segment 26, in turn, communicates with a truncated conical section 34 which has a small diameter end 36 and a large diameter end 38. The small diameter end 36 is in fluid communication with an egress end 28 of the generally vertically extending segment 36. The large diameter end 38 is axially coextensive and coaxial with an expanded diameter conduit portion 40. An annular plenum 42 is thereby defined within the expanded diameter conduit portion 40 between a wall defining that portion and the truncated conical section 34. A bridge section 44 of the conduit array 16 facilitates passage of fluid flow and particulate matter entrained therein from said annular plenum 42 to the evaporator 14.

As shown in the FIGURE, the product treatment system 10 in accordance with the invention can employ a truncated conical section which has a large diameter only slightly larger than the small diameter. The angle of the surface of the truncated conical section 34 relative to the expanded diameter conduit portion 40 will, therefore, be relatively small. It is submitted that the angle can be, in view of the other components of the system, less than 20 degrees.

It will be understood that the mist injection station 18 can serve multiple functions. It can function as a water wash 32 for the particulate material, or it can be employed for adding chemicals to neutralize the effects of corrosive acids and caustic chemicals.

Also, if desired, the truncated conical section 34 and the expanded diameter conduit portion 40 can function as a cyclone. Particulate matter can, therefore, more efficiently be removed.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. An agricultural product treatment system having a desolventizer/toaster (DT) and an evaporator apparatus connected down flow of the DT by a conduit array, further comprising:
    a mist injection station in a segment of the conduit array extending downwardly at an acute angle from an egress port rising from an upper end of the DT;
    a generally vertically extending segment of the conduit array in fluid communication with an egress end of the segment of the conduit array extending downwardly at an acute angle;
    a truncated conical section having a small diameter end in fluid communication with an egress end of said generally vertically extending segment, and an open, large diameter end axially coextensive and coaxial with an expanded diameter conduit portion, thereby defining an annular plenum within said expanded diameter conduit portion; and
    a bridge section of the conduit facilitating passage of fluid flow and particulate matter entrained therein from said annular plenum to the evaporator.

2. The product treatment system in accordance with claim 1 wherein an angle defined by a wall, forming said truncated conical section, relative to an axis with respect to which the various components are defined, is less than 20 degrees.

3. The product treatment system in accordance with claim 1 wherein said mist injection station is located in said conduit array so that said mist injection station can be employed to add chemicals to neutralize the effects of corrosive acids and caustic chemicals.

4. The product treatment system in accordance with claim 1 wherein said truncated conical section and said expanded diameter conduit portion function as a cyclone.

* * * * *